United States Patent [19]

Martineau

[11] 4,178,007
[45] Dec. 11, 1979

[54] HYDRAULIC ANTI-SHIMMY DEVICE FOR CASTER WHEELS

[75] Inventor: Jacques Martineau, Laval, Canada

[73] Assignee: Caelter Enterprises, Ltd., Montreal, Canada

[21] Appl. No.: 890,646

[22] Filed: Mar. 20, 1978

[30] Foreign Application Priority Data

Sep. 23, 1977 [CA] Canada .................................. 287415

[51] Int. Cl.$^2$ ............................................. B60B 33/00
[52] U.S. Cl. .................................. 280/80 R; 16/35 D
[58] Field of Search ................. 16/35 D; 280/90, 113, 280/476 R; 267/150

[56] References Cited

U.S. PATENT DOCUMENTS

| 2,367,993 | 1/1945 | Bishop | 16/35 P |
| 2,761,692 | 9/1956 | Sisulak | 16/35 D |

Primary Examiner—Philip Goodman
Attorney, Agent, or Firm—Limbach, Limbach & Sutton

[57] ABSTRACT

A caster wheel supporting arrangement including anti-shimmy means which is particularly useful for vehicles in which the caster wheels may be orientated at different angles to the parts supported thereby during normal forward movement of the vehicle. Such a situation occurs in large airport runway sweepers where the broom frame, which is supported by caster wheels, may be set at varying orientations to the normal sweeper direction. The support arrangement includes a rotary hydraulic pump, preferably of the gerotor type, the rotor of which is connected to rotate with the caster wheel bracket, and a hydraulic circuit connects the ports of the pump, this circuit including a pressure sensitive flow resisting device which opens to increase the flow area therethrough with increasing pressure difference between the pump ports.

5 Claims, 5 Drawing Figures

HYDRAULIC ANTI-SHIMMY DEVICE FOR CASTER WHEELS

The present invention relates to a caster wheel supporting arrangement incorporating an anti-shimmy device. The invention is particularly applicable to airport runway sweepers having an elongated rotary broom supported by a broom frame, the ends of the broom frame being supported by casters and the center of the broom frame being attached to an overlying main frame. The broom frame is pivotable in the horizontal plane to vary the orientation of the broom relative to the sweeper direction. The casters of course align themselves with the vehicle direction, independently of the orientation of the broom frame, and also allow the sweeper easily to turn corners.

In vehicles of this kind, which may travel at speeds up to 25 miles per hour, some kind of anti-shimmy device is necessary to prevent shimmy occurring in the casters. Presently, friction anti-shimmy devices are used, but these are subject to a rapid rate of wear which requires frequent adjustment of the friction force. The present invention provides a caster wheel supporting arrangement which avoids this drawback.

More specifically, the invention provides a hydraulic anti-shimmy device in which the resistance to flow of a fluid through a flow resisting device is used to restrain movement of the caster wheel.

Hydraulic anti-shimmy devices for caster wheels are known as such, for example from U.S. Pat. No. 2,367,993, which issued Jan. 23, 1945 to Bishop, 2,379,170 to McDaniel, which issued June 26, 1945, and 2,385,891 to Swanson which issued Oct. 2, 1945. However, these known devices are intended for vehicles or aircraft in which there is provided a definite preferred orientation of the caster relative to the vehicle chassis, the anti-shimmy devices being intended to control movement from such preferred orientation, and which of course corresponds to the forward travel of the vehicle or aircraft. Such devices are not suitable for supporting the casters of a runway sweeper broom frame, since they do not take account of the need for towing the frame at different orientations to the direction of travel. The present invention provides a hydraulic anti-shimmy device in which the anti-shimmy forces are relatively constant independent of the orientation of the caster to the structure supported thereby. In fact, the forces which oppose rotation of the caster, and thus provide the anti-shimmy effect, are relatively unaffected both by the position of the caster and by the speed of rotation of the caster wheel bracket.

In accordance with the present invention, in a caster wheel supporting arrangement of known general kind including a rotatable assembly with a caster wheel bracket held for rotation on a chassis member about a generally vertical axis, there is provided a rotary hydraulic pump carried by the member and having a rotor connected for rotation by the rotatable assembly, the pump being such that at any position of the rotor the pump can move hydraulic fluid from one of its ports to the other or vice versa depending on the direction of rotation of the rotor, and the ports of the pump are connected by a hydraulic circuit including a pressure sensitive flow resisting device. The latter device is of the type which opens to increase the flow area therethrough with increasing pressure difference between the pump ports.

The hydraulic circuit, rather than having a single flow resisting device, preferably includes two loops, each having a unidirectional flow resisting device, one of the loops allowing flow of hydraulic fluid in a first direction and the other loop allowing the flow of hydraulic fluid to occur in the reverse direction.

Although the invention will be described particularly in relation to its application to a runway sweeper, it will be understood that the invention may be used in other types of vehicles, either generally to limit or prevent shimmy in caster wheels, or particularly to prevent these where the structure supported by the caster wheels may be intended to be orientated at various directions to the normal forwards direction of vehicle movement. The term "vehicles" includes agricultural machines which may have caster-wheel supported structure of this kind.

The invention will be more particularly described with reference to the accompanying drawings, in which.

Figure 2:
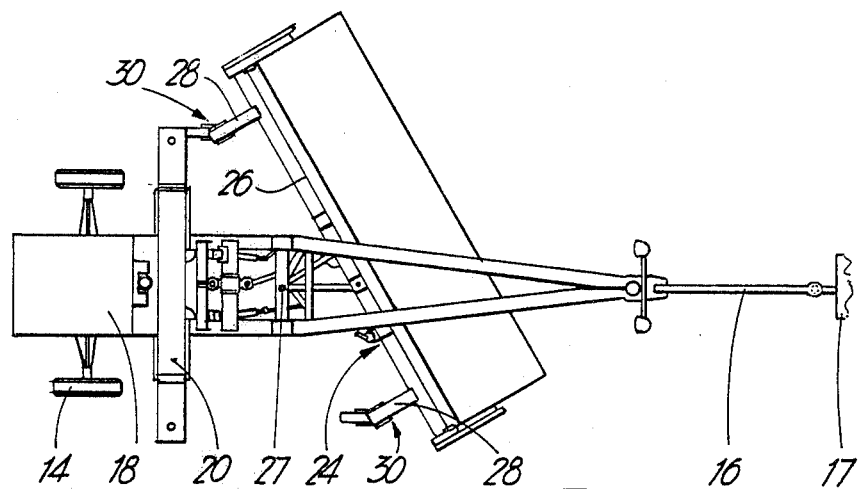
FIGS. 1 and 2 show respectively a side elevation, and a plan view, of an airport runway sweeper which incorporates a caster wheel arrangement in accordance with the invention, FIG. 1 showing the sweeper broom frame normal to the sweeper fore-and-aft axis, and FIG. 2 showing the angled operating portion.
Figure 1:
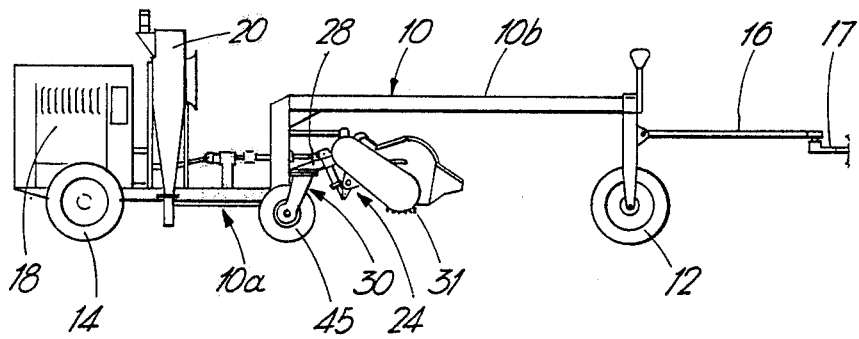

The sweeper shown in FIG. 1 and 2 includes a main frame 10, supported by a single front caster wheel 12, and by two rear wheels 14. The machine is adapted to be towed via a hitch bar 16 by a vehicle not shown but a portion of which is indicated at 17. The main frame includes a low, rear portion 10a which carries an engine 18 and air blower 20, and a central raised frame portion 10b which extends over a broom frame 24 supported at the junction between the frame portions 10a and 10b. The broom frame has a rear supporting tube 26, which is pivotably supported at a point behind its center on a pivot bearing 27 of the main frame. The broom frame is also supported at each end by a caster wheel assembly 30, via a rearwardly extending member 28 connected to the tube 26. The broom frame, which carries an elongated, cylindrical, rotatable broom 31, is adapted to be swung in the horizontal plane about the pivot 27, and may for example be used when orientated 30° from the normal to the fore and aft sweeper axis, at either side of this axis, asindicated in FIG. 2. Whichever angle the broom frame adopts, the caster wheel assembly 30 will of course allow the caster wheels to align with the fore and aft axis. The structure so far described is conventional.

Figure 3:
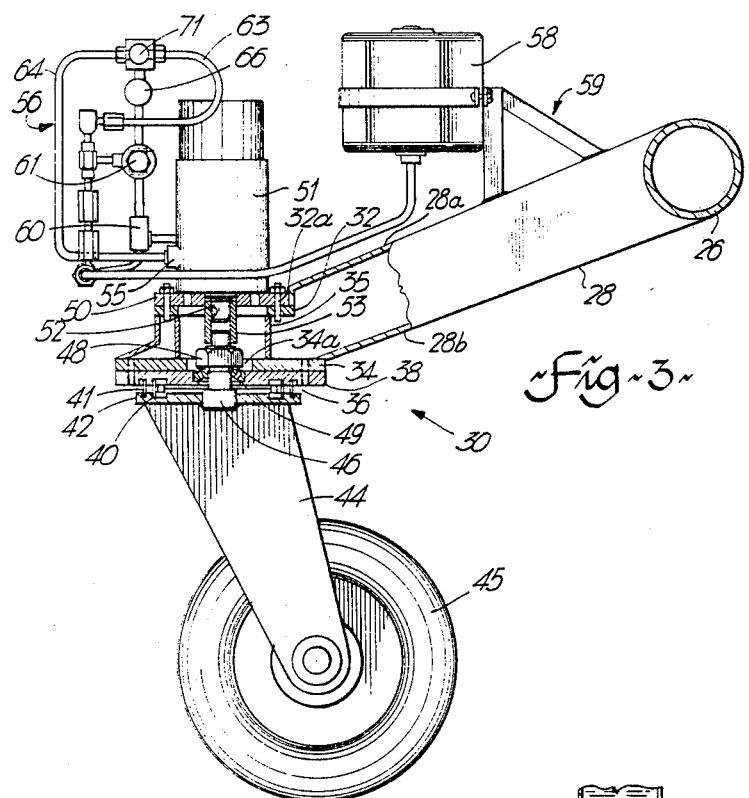
FIG. 3 shows a detailed, partly sectioned view of a caster wheel supporting arrangement.

The caster wheel assembly is shown in detail in FIG. 3. This shows the member 28 which extends from tube 26 as being a box-like member having sloping upper and lower plates 28a and 28b, the upper plate 28a being partly recessed and partly built up to receive a horizontal mounting plate 32 having a large central aperture. The lower end of the member 28 has welded thereto a lower mounting plate 34, and a hollow member 35 welded between the mounting plates 32 and 34 reinforces this structure. The lower mounting plate 34 has side flanges which receive bolts holding a bearing housing plate 38 against the underside of plate 34, this bearing housing plate carrying the upper portion of roller bearings 40 which locate a lower bearing plate 42 carrying the caster bracket 44 with caster wheel 45. In the center of bearing plate 42 is welded a pin 46, having a threaded portion which receives a self-locking nut 48, this locking nut holding in place the upper part of a tapered roller bearing 49 which acts against the upper part of bearing housing plate 38 to hold the caster wheel assembly in position. The self-locking nut 48 is used to preload the arrangement of bearings to give a suitable tightness in the assembly. A dust shield 41 protects the bearings 40.

The upper plate 32 has bolt holes for welded in bolts 32a, which receive the mounting plate 50 of a hydraulic pump/motor 51 of the gerotor type. This is a device which can act as a hydraulic motor or pump, and which has an internally toothed ring member and an externally toothed star member which acts as a rotor and performs a rotary movement about the axis of the ring member, the device having suitable passages and ports which allow this movement to cause a pumping action. An example of a gerotor device is described in Canadian Pat. No. 751,734 issued Jan. 31, 1967 to Charlson. A type of gerotor pump is chosen with no case drain, this type of pump having an efficiency of about 95%. Whatever kind of pump is used, it must be such that permissible leakage from the pressure chamber to the outlet chamber is kept to a minimum in order not to create a shimmy effect induced by the pump itself. The pump also must be such that at any position of the rotor the pump can move hydraulic fluid between its two ports, in either direction depending on the direction in which the rotor is rotated, the efficiency of pumping preferably being substantially constant independent of the rotational position of the rotor and independent of the direction of rotation. The pump is mounted with its rotor spindle 52 directly above and aligned with the pin 46, and these two parts are connected by a sleeve 53 which is keyed to both of these parts, with a snug fit between the keys and keyways. This is essential to prevent a secondary shimmy effect being induced in the system by a mismatch of mechanical elements.

Figure 4:
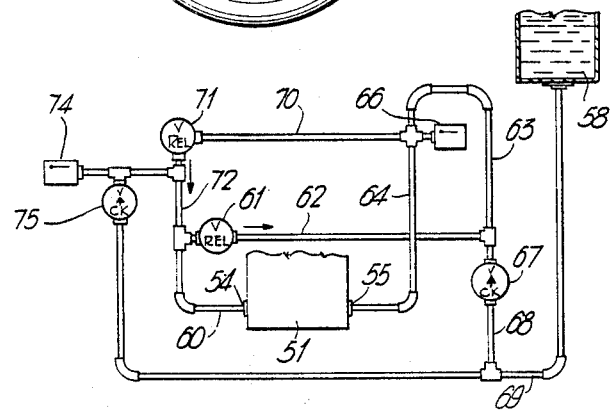
FIG. 4 shows a diagrammatic view of a hydraulic circuit.

The two ports 54 and 55 of the pump are connected into a hydraulic circuit which is indicated at 55 in FIG. 3, and shown diagrammatically but in more detail in FIG. 4. As actually constructed, and illustrated in FIG. 3, the hydraulic circuit is a three dimensional arrangement, but this has been spread out in FIG. 4 into two dimensions for ease of illustration, and in FIG. 4 items such as adapters have been omitted. The hydraulic circuit includes a first loop allowing hydraulic fluid to flow from port 54 to port 55 while the pump is rotating in a first direction, being turned by the caster bracket 44, and a second loop allowing hydraulic fluid to flow in the reverse direction from port 55 to port 54 during rotation of the pump rotor in the opposite direction. The circuit also includes a reservoir 58 which is mounted on a bracket 59 on top of the member 28.

In more detail, the first loop of the hydraulic circuit includes a conduit portion 60, connected to port 54, a pressure sensitive flow resisting device 61, and conduit portions 62, 63 and 64, the latter being connected to port 55. The device 61 is a standard adjustable pressure relief valve which allows fluid to flow in the direction of the arrow when pressure on the inlet side reaches a predetermined minimum (adjustable) pressure. The pressure is set so as to require a torque of between 25 and 30 foot pounds on the caster bracket 44 before the device 61 opens and allows rotation of the pump rotor and of the bracket. This first loop of the circuit also includes an expansion valve 66 which allows excess hydraulic pressure to be relieved, and a check valve 67 connected via conduit portions 68 and 69 to the reservoir 58, the check valve 67 allowing makeup from the reservoir 58, these items 66 and 67 allowing for fluid expansion during hot temperature operation, and fluid contraction during cold weather operation.

The second loop of the hydraulic circuit includes the conduit portion 64, a conduit portion 70, the flow restricting device 71, and conduit portions 72 and 60 leading back to port 54. The device 71 is identical to device 61, but is set to allow fluid to flow through this second loop from port 55 to port 54. Again, this loop includes an expansion valve 74, and a check valve 75 connected to the reservoir, giving compensation for temperature changes as described. Since the amount of fluid released through valves 66 and 74 is small, these need not be connected to the reservoir.

Figure 5:
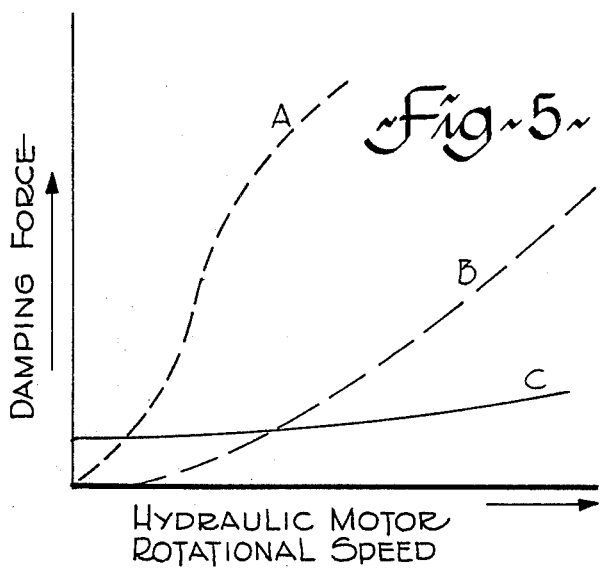
FIG. 5 is a graph showing the relationship between damping force on the caster wheel movement, and the speed of rotation of the caster wheel bracket.

In operation, the hydraulic circuit allows the caster wheel bracket 44 to pivot as required for normal manoeuvers of the airport sweeper. The caster bracket can assume any position required depending on the orientation of the broom frame. Whem the sweeper is operating in a straight ahead direction, the resistance to rotation of the pump rotor, imposed by the hydraulic circuit, will effectively eliminate shimmy of the caster wheel. With the flow restricting devices 61 and 71, rotation of the pump rotor, and therefore of the bracket 44, is resisted until the torque on the bracket is sufficient to produce a predetermined pressure difference across device 61 or 71, depending on direction of rotation, after which the flow restricting device opens and then imposes a relatively constant restriction to flow and thus a relatively constant restraining torque on the caster wheel bracket. This is illustrated in FIG. 5, where the damping (restraining) force is shown on the vertical axis of the graph, against rotational speed of the pump rotor on the horizontal axis, and the solid line C shows the characteristic of the flow restricting devices as described. It can thus be seen that the torque restraining caster rotation is relatively independent of rotation speed and also of caster position, and also allows full 360° of caster rotation. The broken lines A and B in FIG. 5 show for comparison the characteristics of orifices of fixed sizes, wherein the damping force increases appreciably with the speed of rotation. The fixed kind of orifice would not be so effective for the present purposes since if set to give sufficient control for low speed operation it would then provide excessive control during high speed operation. It is notable that it is this kind of fixed orifice which has generally been used in prior art hydraulic dampers.

I claim:

1. A caster wheel supporting arrangement comprising:
   a chassis member carrying bearing means having a generally vertical axis,
   a rotatable assembly including a caster wheel bracket held by said bearing means,
   a rotary hydraulic pump carried by the chassis member and having a rotor connected for rotation by the rotatable assembly, said pump having two ports and being such that at any position of the rotor the pump can move hydraulic fluid from one port to the other or vice versa depending on the direction of rotation of the rotor, and a hydraulic circuit connecting the ports of the pump and including a pressure sensitive flow resisting device of the type which opens to increase the flow area therethrough dependent on the pressure difference between said ports.

2. A caster wheel supporting arrangement according to claim 1, wherein said hydraulic circuit includes a first loop connecting said ports and having a first unidirectional pressure sensitive device of said type, and which allows flow between said ports in said first direction, the circuit having a second loop with a second unidirectional pressure sensitive device of said type which allows flow between said ports in a direction reverse to said first direction.

3. A caster wheel supporting arrangement according to claim 1 or claim 2, wherein each pressure sensitive flow restricting device is an adjustable relief valve.

4. A caster wheel supporting arrangement according to claim 1 or claim 2, wherein said pump is of the gerotor type.

5. A vehicle having a frame adapted to carry a ground engaging device, and in which the frame is partly supported by a caster wheel and is adjustable in the horizontal plane to lie at variable orientation relative to the normal vehicle direction, and wherein said caster wheel is supported from said frame by supporting means including a chassis member attached to the frame and carrying bearing means having a generally vertical axis, said support means further comprising:

a rotatable assembly including a bracket for said caster wheel, said assembly being held for rotation by said bearing means, a rotary hydraulic pump carried by said chassis member and having a rotor connected for rotation by the rotatable assembly, said pump having two ports and being such that at any position of the rotor the pump can move hydraulic fluid from one port to the other or vice versa depending on the direction of rotation of the rotor, and a hydraulic circuit connecting the ports of the pump and including a pressure sensitive flow resisting device of the type which opens to increase the flow area therethrough dependent on the pressure difference between said ports.

* * * * *